G. Daries,
Hollow Auger,
N° 20,866.    Patented July 13, 1858.

UNITED STATES PATENT OFFICE.

GEORGE DAVIES, OF DUQUESNE, PENNSYLVANIA.

TOOL FOR CUTTING CYLINDRICAL OR TAPERING STICKS.

Specification of Letters Patent No. 20,866, dated July 13, 1858.

*To all whom it may concern:*

Be it known that I, GEORGE DAVIES, of the borough of Duquesne, in the county of Allegheny and State of Pennsylvania, have invented a new and useful Improvement in Tools for Cutting Tapered Handles, &c.; and I do hereby declare the following to be a full, clear, and exact description thereof, reference being had to the annexed drawing, forming part of this specification, in which—

Figure 1:
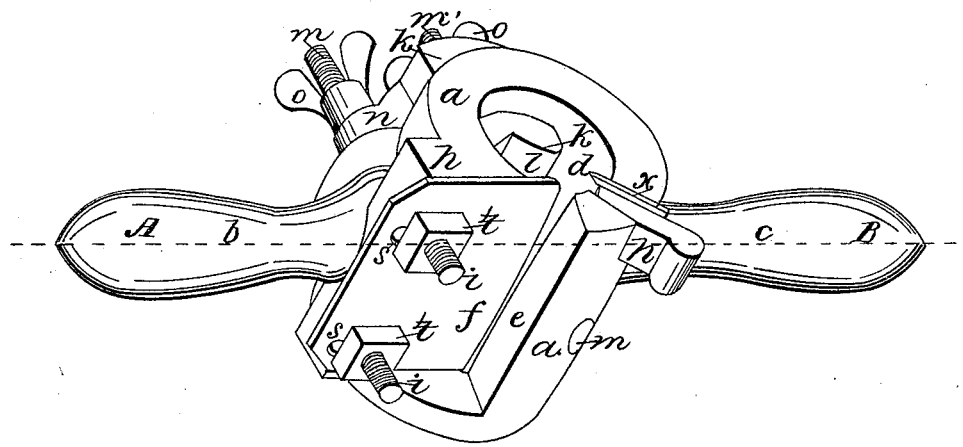
Figure 2:
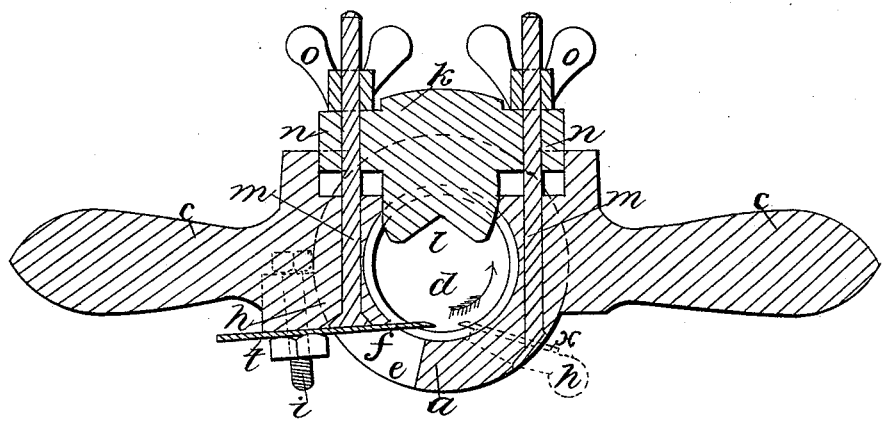

Figure 1, represents a perspective view of my improvement. Fig. 2, is a section through A, B, Fig. 1.

Like letters of reference denote similar parts in both figures.

My implement, which I call a "shaver" is designed to cut pieces of wood round and smooth, and either tapered or of uniform diameter, for handles of tools, and other purposes.

To enable others skilled in the art, to make and use my improved shaver, I will proceed to describe its construction, and operation.

The stock of the implement, $a$ is a short cylindrical block of iron with two handles $b$, $c$ projecting from opposite sides of the stock $a$, at right angles to its axis. The stock $a$ and the handles $b$ and $c$ may be cast in one piece. Through the axis of the cylindrical stock $a$ is a bore $d$, of sufficient diameter to receive a piece of wood of the largest size which the implement, is designed to dress and taper. This bore $d$, is of larger diameter at one end of the stock $a$, than at the other; tapering gradually from one end to the other. In the side of the cylindrical stock, near to one of the handles $b$ is an opening $e$ in the stock (see Fig. 2) to receive the chisel or bit $f$, which rests against a shoulder, or flange $h$, projecting from the side of the cylindrical stock $a$. The bit $f$, is fastened to the shoulder $h$ by two screw bolts $i$, $i$, passing through the shoulder $h$, and through slots $s$, $s$, in the bit $f$. The bit being adjusted and tightened in place by the screw nuts $t$, $t$. This bit is set at such an angle that its edge entering the circumference of the cylindrical stock $a$, cuts the wood with ease: the point being inclined a litle toward the center of the stock and yet the bit being nearly at a tangent to the inner circumference, or bore of the cylinder. The edge of the bit is also a little inclined from a line parallel to the axis of the bore, to allow for the taper of the bore, as seen in Fig. 1. An adjustable block $k$, of the shape shown in section in Fig. 2, is inserted into the side of the cylindrical stock, $a$, between the two handles $b$, $c$, and opposite to the point of the bit $f$, the object of this adjustable block $k$ being to reduce the diameter of the bore of the cylindrical stock $a$ at pleasure, so as to cause it to cut a stick of smaller diameter, than the diameter of the bore of the cylindrical stock. There is a groove or trough $l$ in the face of the block, which enters the bore of the cylindrical stock, $a$, parallel to the axis of the bore $d$; which prevents the stick moving sidewise, away from the edge of the bit, $f$. This adjustable block $k$ is held in place by two bolts $m$, $m$, one on each side, which pass through the cylindrical stock $a$ near to the base of the handles $b$, $c$, and through projections $n$, $n$ made for that purpose, on either side of the block, $k$. The position of the block $k$, is regulated by the thumb screws $o$, $o$ on the end of the bolts $m$, $m$; the thumb screws $o$, $o$, bearing on the outer surface of the block $k$. A small cutter $x$, with a sharp point projecting into the bore of the cylindrical stock $a$, is secured in place at one end of the stock $a$ by a wedge $p$. This cutter is set pointing toward the edge of the bit $f$, for the purpose of freeing the wood of the shaving cut by the bit $f$, and thus preventing the tearing or splintering of the wood.

My improved shaver, constructed as above described, is used as follows: The block $k$ is set so as to reduce the diameter of the bore $d$ of the cylindrical stock $a$ at its smaller end, to the required diameter of the stick, or handle, to be dressed. The stick is then secured in a perpendicular position in a carpenter's bench or vise, and the operator, holding the shaver with a handle in each hand, and the end of the stick inserted in the larger diameter of the bore, turns the shaver in the direction of the arrow in Fig. 2. The taper in the bore of the cylindrical stock $a$ and the set of the bit $f$, causes the bit to act as a screw, and the shaver works its way down the stick of wood cutting it perfectly round, and of uniform diameter throughout, so smooth as to need no further dressing.

If it is desired to give the stick to be dressed a taper, it is done by loosening the thumb screws $o$, $o$, a little every few turns of the shaver, so as to withdraw the block $k$ by degrees, from the inside of the stock $a$, thus increasing the diameter of the bore. When the thumb screws are loosened the block is pressed back, and the diameter of bore being thus increased, the stick, which is being cut and dressed, gradually increases in diameter, and is cut with a smooth and regular taper, if the thumb screws have been loosened uniformly, as the stick passes through the shaver.

My improvement is designed to be used principally in making handles for tools, such as hammers, picks, hatchets chisels, &c. and making pins for framing bridges, when the use of a lathe to turn the stick would be impossible, or highly inconvenient.

What I claim as my invention, and desire to secure by Letters Patent, is—

The combination of the cylindrical stock $a$, adjustable block $k$, and bit $f$, constructed and arranged as described; forming an improved tool, for cutting round or tapered sticks for handles &c.

In testimony whereof I have hereunto set my hand this seventh day of April A. D. 1857.

GEORGE DAVIES.

Witnesses:
W. DUDLEY KING,
L. P. STONE.